UNITED STATES PATENT OFFICE.

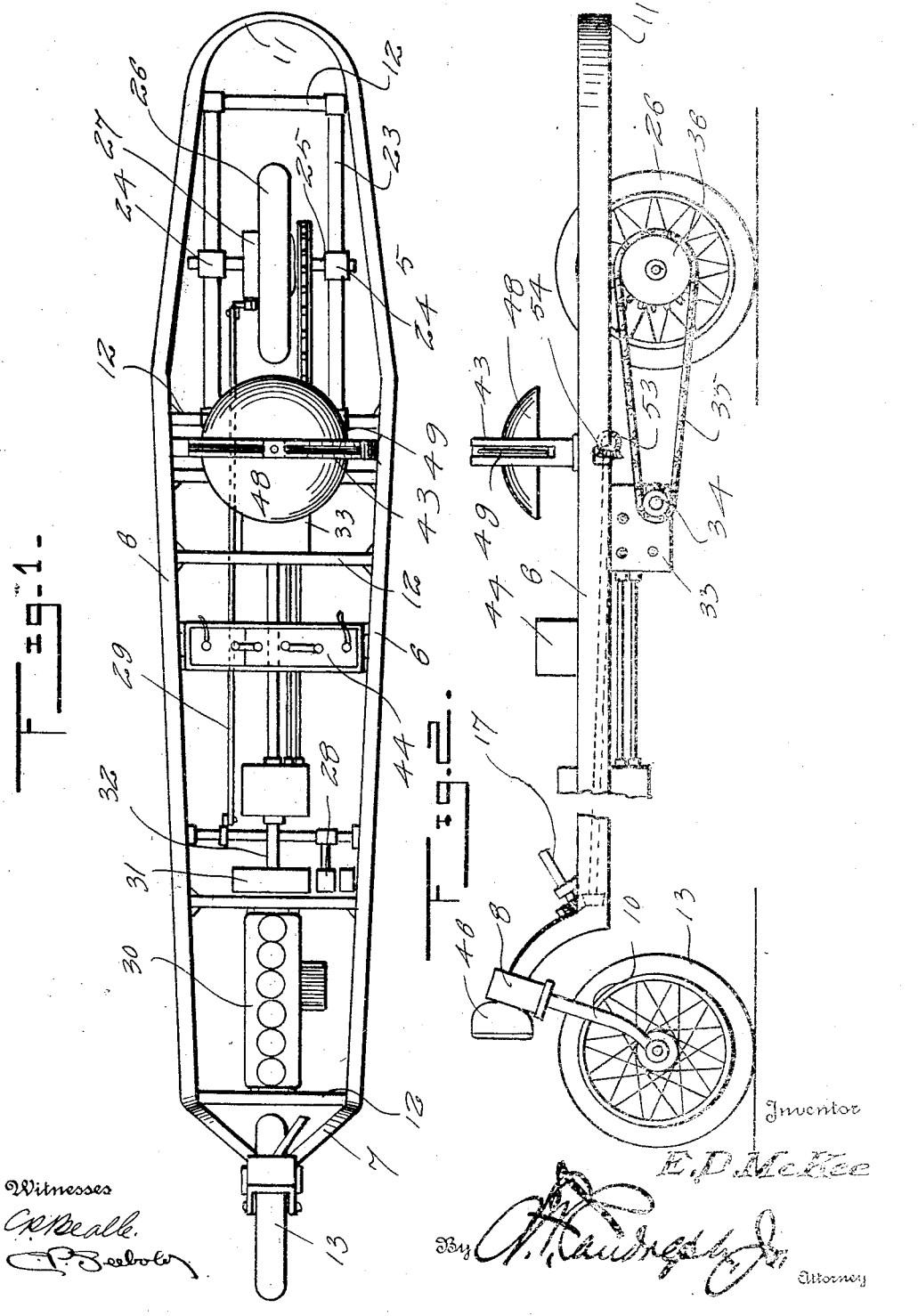

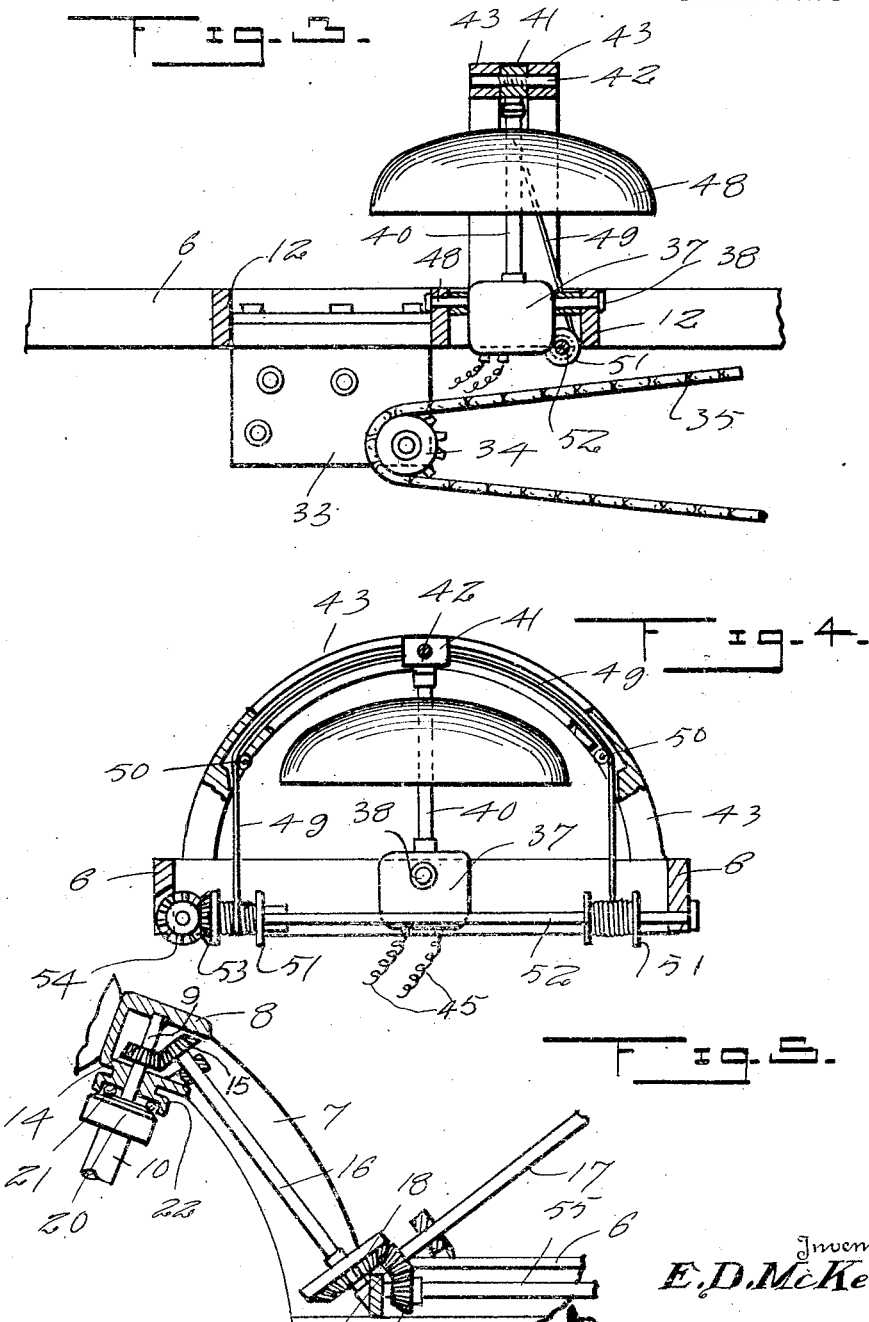

ENOCH D. McKEE, OF ELDORADO, KANSAS.

STABILIZER FOR MOTORCYCLES.

1,362,024.  Specification of Letters Patent.  Patented Dec. 14, 1920.

Application filed September 27, 1917. Serial No. 193,613.

*To all whom it may concern:*

Be it known that I, ENOCH D. McKEE, a citizen of the United States, residing at Eldorado, in the county of Butler and State of Kansas, have invented certain new and useful Improvements in Stabilizers for Motorcycles, and that I do hereby declare the following to be a full, clear, and exact description of the invention, such as will enable others skilled in the art to which it appertains to make and use the same.

This invention relates to improvements in motorcycles of the two-wheeled type, and has for its object to provide a vehicle of this character equipped with a pendulum stabilizer having a spinning pendulum-bob for maintaining the equilibrium of the vehicle in making curves in the roadway, and thus prevent the vehicle from being upset by centrifugal force.

Another object is the provision of means controlled by the steering gear for automatically tilting the frame of the vehicle with relation to the axis of the pendulum when making the curve.

With these and other objects in view, the invention consists in the novel construction, combination and arrangement of parts as will be hereinafter specifically described, claimed and illustrated in the accompanying drawings, in which:

Figure 1 represents a fragmentary plan view of the improved motorcycle,

Fig. 2 represents a fragmentary side elevation thereof,

Fig. 3 represents a vertical sectional view through the stabilizer and driving means therefor, Fig. 4 represents a vertical section view taken transversely through the frame of the motorcycle in the plane of the axis of the stabilizer, and Fig. 5 represents a fragmentary longitudinal section, illustrating the driving connections between the steering post and steering wheel and stabilizer control.

Referring to the drawings in detail, wherein similar reference numerals designate corresponding parts throughout the several views, the numeral 5 indicates generally the supporting frame, which includes the longitudinal side members 6, having upwardly curved and converging front terminals 7 connected with the hollow head 8 in which the head post 9 of the front forks 10 is pivotally mounted. The rear terminals of the side members are connected by the rear curved connecting member 11, and intermediate their ends the side members are connected by a series of transverse braces 12.

A front steering wheel 13 is journaled between the lower terminals of the front forks 10 and the post 9 is rigidly connected with a bevel gear wheel 14, meshing with a similar gear wheel 15, carried by an inclined shaft 16 through which the rotary movement of the steering post 17 is transmitted to the front wheel 13 to steer the vehicle. The lower terminal of the intermediate shaft 16 is provided with a beveled gear 18 meshing with a beveled pinion 19 carried by the lower terminal of the steering post 17, which latter is provided at its upper end with the usual steering wheel (not shown).

The base portion of the post 9 is provided with an integral flange 20, which rests against a series of bearing balls 21 arranged in a groove formed in the enlarged lower terminal 22 of the hollow head 8 to reduce frictional resistance to the steering movement of the front wheel 13.

Two of the transverse connecting members 12 at the rear end of the supporting frame 5 are connected by spaced parallel supporting rails 23, which support bearings 24 for the rear axle 25. The rear driving wheel 26 is journaled upon the axle 25 and is equipped with a preferred type of brake 27 operable by a pedal 28 located conveniently near the driver of the vehicle and actuated through a connecting rod 29.

A preferred type of propelling engine 30 is supported in the front part of the frame structure 5 between two of the intermediate braces 12 and the engine shaft is connected through a combined clutch and fly wheel 31 with the drive shaft 32, which extends into the housing 33 of a transmission gear through which the power is transmitted to the sprocket wheel 34. The movement of the sprocket wheel 34 is transmitted to the rear wheel 26 through a chain 35 and sprocket wheel 36.

The casing 37 of a preferred type of electric motor is provided with diametrically opposed trunnions 38, pivotally supported in two of the closely arranged transverse connecting members 12, and the shaft of the motor is extended vertically a distance above the housing, as indicated at 40, and is journaled in a bearing 41. A guide pin 42 is secured transversely through the bearing member 41 and projects into a pair of spaced and slotted guides 43, which slidably confine the bearing member 41 and guide it during swinging movement of the motor 37 and shaft 40. Guides 43 are curved concentrically with the pivotal axis 38 of the motor and the latter is supplied with electrical current from a storage battery or other source of electro-motive force 44 by flexible conductors 45. If desired, the current of the battery 44 may be also utilized to operate an electric headlight 46 and an electric starter for the engine 30.

A fly wheel 48 is rigidly secured upon the vertical motor shaft 40 between the motor 37 and the bearing member 41, and a pair of cables 49 is secured to the opposed sides of the bearing member 41, extend downwardly between the guides 43, over guide pulleys 50, and are oppositely wound upon drums 51 supported upon the drum shaft 52. The drum shaft 52 is arranged underneath the guides 43 and is connected at one terminal with a bevel gear wheel 53, which meshes with a similar gear wheel 54, carried upon the longitudinal shaft 55, extending alongside one of the side members 6 and provided at its forward terminal with a bevel gear wheel 56, which meshes with the bevel pinion 19 of the steering post 17.

The arrangement of the several gear wheels connecting the steering post 17 with the drum shaft 52 is such that when the steering post 17 is actuated to turn the steering wheel 13 to the left, the shaft 52 is rotated in a direction to wind the cable 49 upon the right-hand drum 51, and owing to the fact that the shaft 40 is maintained in a vertical position by the rotating or spinning influence of the fly wheel 48, the right side of the frame 5 is elevated and the left side is depressed in order that the frame 5 and wheels 13 and 26 may be properly tilted to counteract the influence of centrifugal force in rounding the curve in the roadway. As the steering post 17 is revolved to return the steering wheel 13 to its initial position, the movement of the post is transmitted to the shaft 52 and through the cables 49, which return the entire frame structure and parts supported thereby, including shaft 40 to their initial position.

It will be understood that this structure provides a stabilizer for road vehicles of the two wheel type, that comprises a pendulum-like structure with the shaft 40 of the pendulum extending upright and with a spinning-bob or fly-wheel 48 that constantly tends to maintain the shaft 40 in a vertical position at all times. Furthermore, it will be understood that because of the fact that the guides 43 are rigidly secured to side-bars 6 of frame 5, thus preventing the shaft 40 from swinging fore and aft of the frame, an added advantage is secured, as the tendency of the spinning-bob 48 to swing the shaft 40 to a vertical position tends to retard the speed of the vehicle in going down grades and to accelerate it in going up.

What I claim is:

1. A motorcycle including a supporting frame, propelling and steering wheels therefor, a pendulum stabilizer supported by said frame, said pendulum stabilizer comprising a rotating shaft, and a fly-wheel secured to said shaft, and means for simultaneously actuating said steering wheel and for tilting said frame laterally with relation to the stabilizer.

2. A motorcycle including a supporting frame, supporting wheels therefor, a motor pivotally supported on a horizontal axis in said frame and including a shaft, a wheel mounted upon said shaft for rotation therewith, and means for guiding the movement of the upper terminal of said shaft.

3. A motorcycle including a supporting frame, supporting wheels therefor, guides carried by said frame, a motor pivotally mounted in said frame and including a shaft rotatably supported in said guides, a wheel mounted upon said shaft for rotation therewith, and means for adjusting said frame with relation to said motor and shaft.

4. A motorcycle including a supporting frame, supporting wheels therefor, a motor pivotally mounted on a horizontal axis in said frame and including a shaft, a wheel supported upon said shaft, a horizontal shaft journaled in said frame, means connecting the second-mentioned shaft with the first-mentioned shaft for tilting the frame with relation to the motor shaft, and means for actuating the second-mentioned shaft.

5. A motorcycle including a supporting frame, supporting wheels therefor, a motor pivotally mounted in said frame, and including a vertically disposed shaft, a wheel supported upon said shaft, guides for the upper terminal of said shaft, a bearing member slidably confined by said guides and rotatably receiving the upper terminal of said shaft, a winding shaft journaled in said frame, flexible elements connecting said bearing member with the winding shaft and being oppositely wound upon the latter, and means for actuating the winding shaft to tilt the frame with relation to the motor shaft.

6. A motorcycle including a frame, supporting wheels therefor, a motor pivotally mounted in said frame and including a motor shaft, a wheel operable by said motor shaft, a winding shaft journaled in said frame, flexible elements connecting the upper terminal of the motor shaft with the winding shaft and being oppositely wound upon the latter for tilting the frame with relation to the motor shaft, and manually operable means for actuating the winding shaft.

7. A motorcycle including a frame, supporting wheels therefor, a steering post connected with one of said wheels, a stabilizer comprising a constantly driven shaft and having a wheel secured thereto, and means controlled by said steering post for tilting said frame with relation to the shaft of the stabilizer simultaneously with the steering movement of the wheels.

In testimony whereof I affix my signature in presence of two witnesses.

ENOCH D. McKEE.

Witnesses:
    H. D. WALLACE,
    C. C. ZIMMERMAN.